United States Patent [19]
Stone et al.

[11] 4,012,934
[45] Mar. 22, 1977

[54] MULTIPURPOSE METAL WORKING MACHINE

[75] Inventors: Guthrie B. Stone, Honeoye; William F. Holmes, Springwater, both of N.Y.

[73] Assignee: Springwater Mfg. Co., Inc., Honeoye, N.Y.

[22] Filed: Sept. 14, 1973

[21] Appl. No.: 397,572

[52] U.S. Cl. .................................. 72/324; 83/574
[51] Int. Cl.² ................ B21D 43/28; B21K 27/06; B26D 5/08
[58] Field of Search ............ 72/442, 324, 333, 338; 83/549, 550, 571, 618; 29/565, 560.1

[56] References Cited
UNITED STATES PATENTS

| 434,231 | 8/1890 | Babcock | 29/560.1 |
| 2,053,309 | 9/1936 | Yeager | 72/324 X |
| 2,456,749 | 12/1948 | Steibel | 72/412 |
| 3,559,522 | 2/1971 | Valente | 83/571 |
| 3,678,724 | 7/1972 | Stone et al. | 83/574 |

Primary Examiner—Milton S. Mehr
Attorney, Agent, or Firm—Clarence A. O'Brien; Harvey B. Jacobson

[57] ABSTRACT

Punching, shearing or bending operations are performed at different work stations along a common machine bed by selectively withdrawing coupling pins interconnecting adjacent tool carrying members supported by a pair of guide rods along which relative movement is imparted to uncoupled tool carrying members by a power operated piston rod connected to one of the slidable tool carrying members. Adjustable work support and guide facilities are provided at each of the work stations.

15 Claims, 13 Drawing Figures

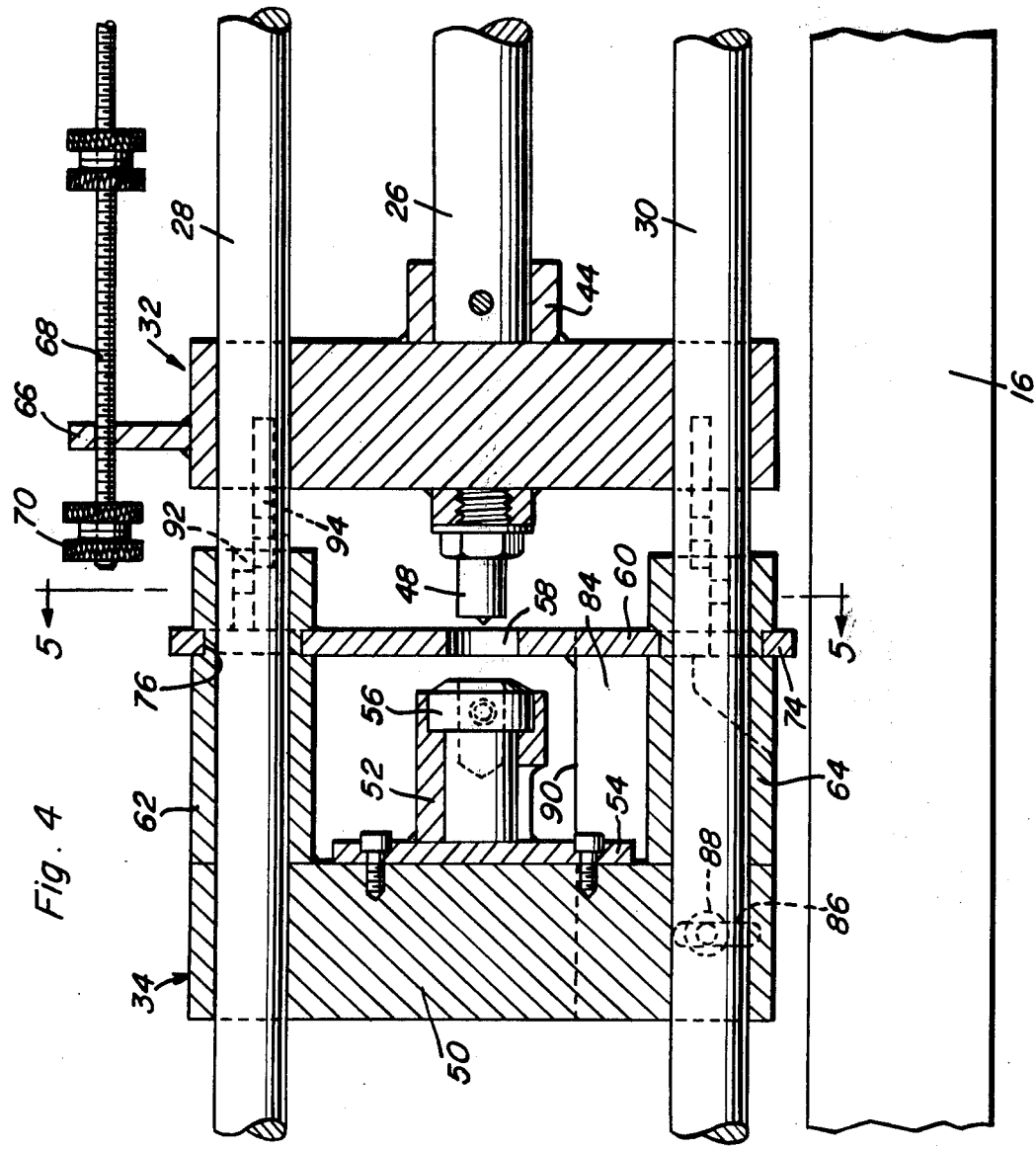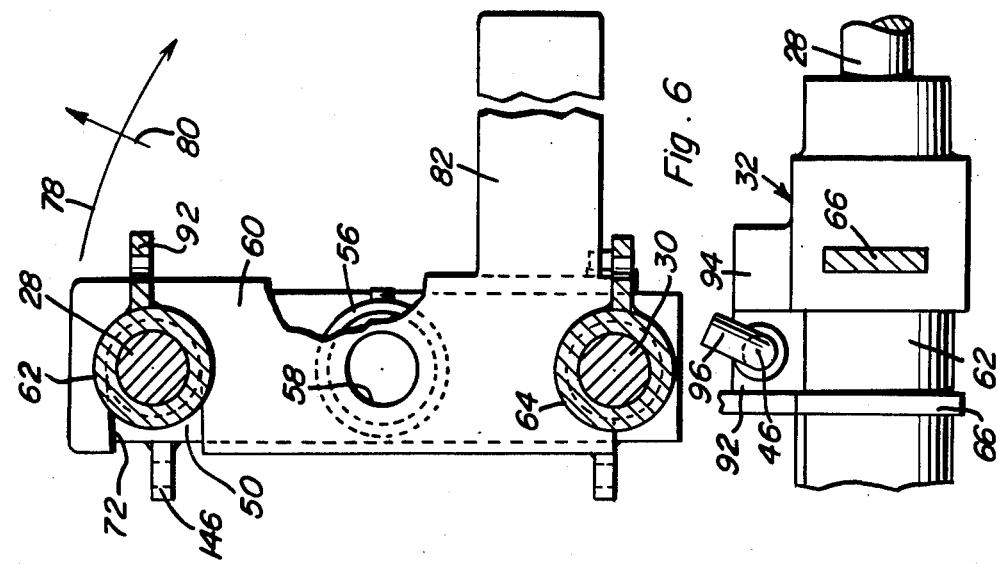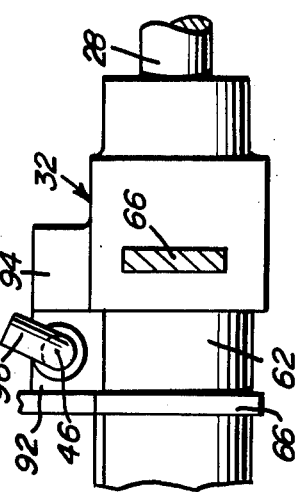

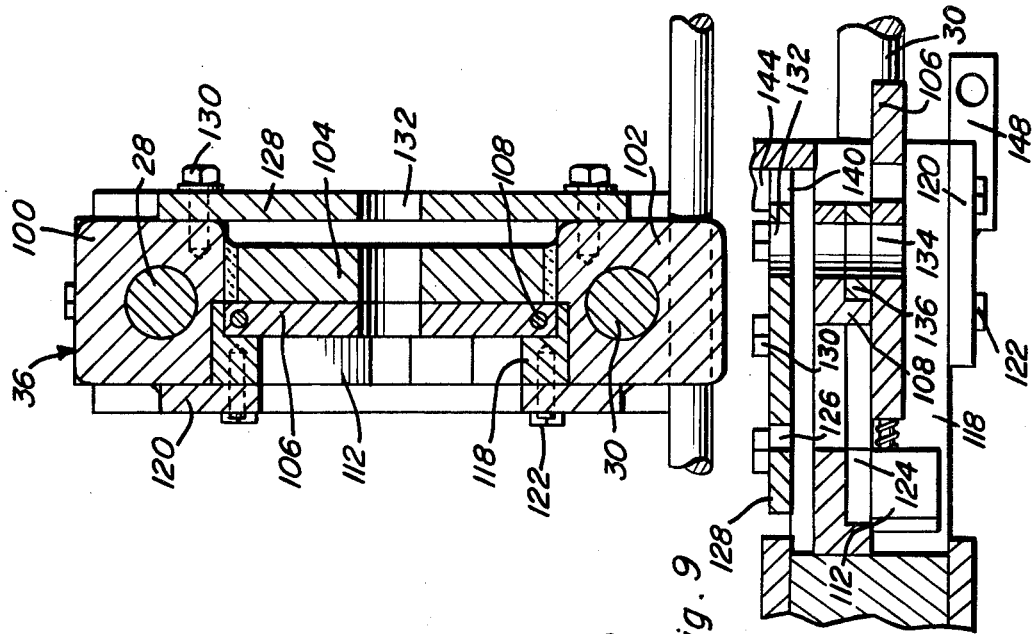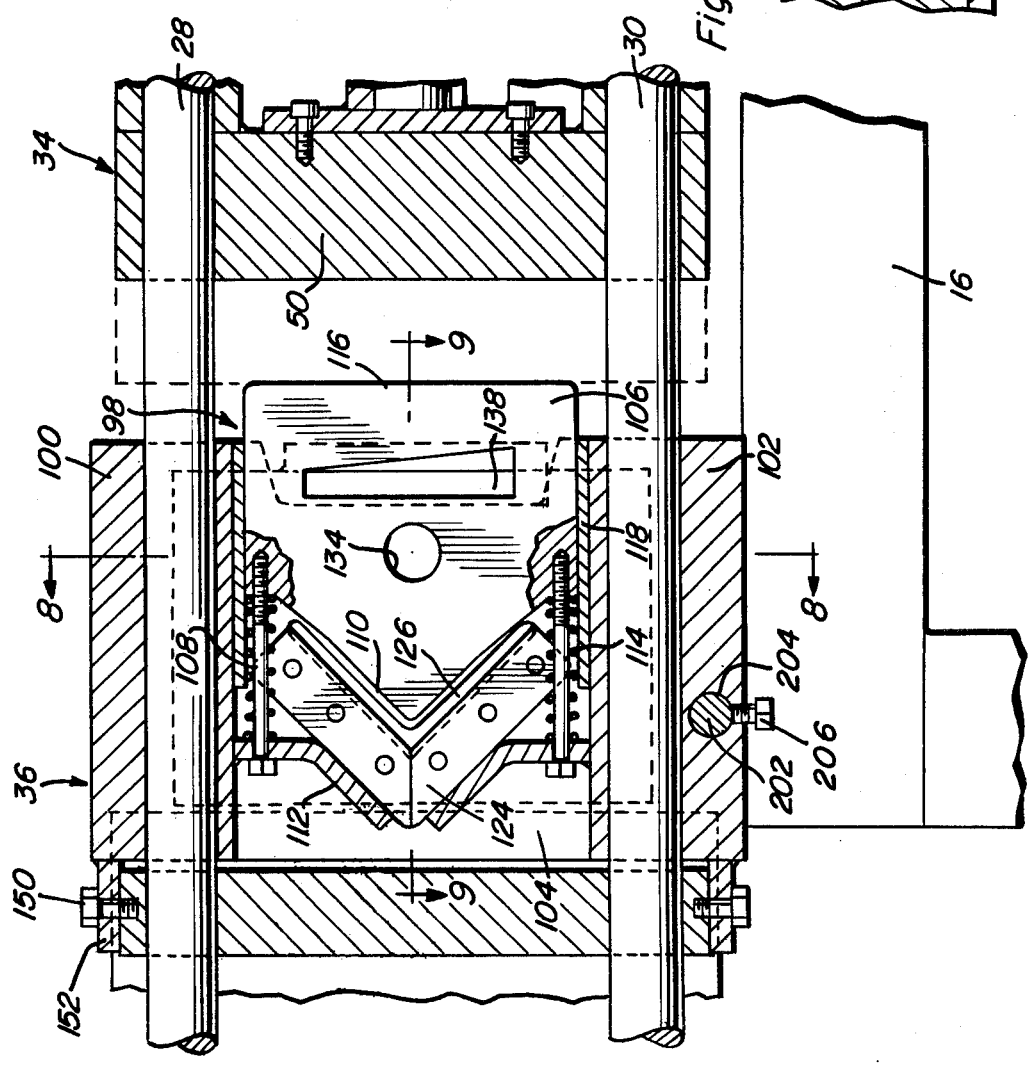

MULTIPURPOSE METAL WORKING MACHINE

This invention relates to general to multipurpose machines for performing different material deforming operations on workpieces and more particularly to a machine on which punching, shearing and bending operations may be performed on metal workpieces.

Work deforming machines capable of being used to perform different operations, are well known. Such machines generally include a single ram or slide member as disclosed, for example, in our prior U.S. Pat. No. 3,678,724, and; require, however, replacement of tool members on the ram and the bed. This involves the expenditure of a considerable amount of time and skill when changing over from one type of operation to another. Further, the inactive sections of such machines often pose a danger to the machine operator and accuracy suffers as a result of the accommodations made for performing different operations. It is therefore a general object of the present invention to provide a multi-function, work deforming machine which overcomes the aforementioned drawbacks and disadvantages or prior machines. A more specific object of the invention is to provide a machine that requires little time, effort or skill to change over from one operation to another and which is capable of performing many types of punching, shearing and bending operations in a safe and accurate manner.

In accordance with the present invention, three different work stations are established along the common bed of a machine frame between adjacent tool carrying members slidably mounted on a pair of parallel spaced guide rods fixed to the frame. A fluid power operated piston rod is connected to the punch tool carrying member for reciprocation thereof relative to a punch die tool mounted on an adjacent tool carrying member. The punch and die tool carrying members while set-up may be coupled to each other by a coupling pin in an inactive condition in order to transmit the force of the piston rod to the movable blade of a shearing mechanism carried by another tool carrying member locked to the frame at the shearing station by means of another coupling pin. Yet another coupling pin is provided to couple the shear tool carrying member in an inactive condition, to the punch die tool carrying member so as to transmit bending force to a female bending die at the bending station rendered active by removal of the frame locking coupling pin which otherwise couples a stop member to the female bending die connected to the shear tool carrying member. Thus, by selective withdrawal and insertion of coupling pins, relative movement between two tool carrying members is produced in response to reciprocation of the piston rod, at a selected one of the work stations in order to perform one of the three types of work deforming operations. Since the adjacent tool carrying members at the inactive stations are coupled to each other by a coupling pin, safe operation of the machine is assured. Further, the tools at the inactive stations may remain set-up for rapid operational change over.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 4 is an enlarged partial, side sectional view taken substantially through a plane indicated by section line 4—4 in FIG. 3, showing the metal punching station in an active condition.

FIG. 5 is a transverse sectional view taken substantially through a plane indicated by section line 5—5 in FIG. 4.

FIG. 6 is a partial top plan view of the punching station portion of the machine in an inactive condition.

FIG. 7 is an enlarged, partial side sectional view, showing the shearing station in an active condition.

FIG. 8 is a transverse sectional view taken substantially through a plane indicated by section line 8—8 in FIG. 7.

FIG. 9 is a partial top sectional view taken substantially through a plane indicated by section line 9—9 in FIG. 7.

Figure 1:
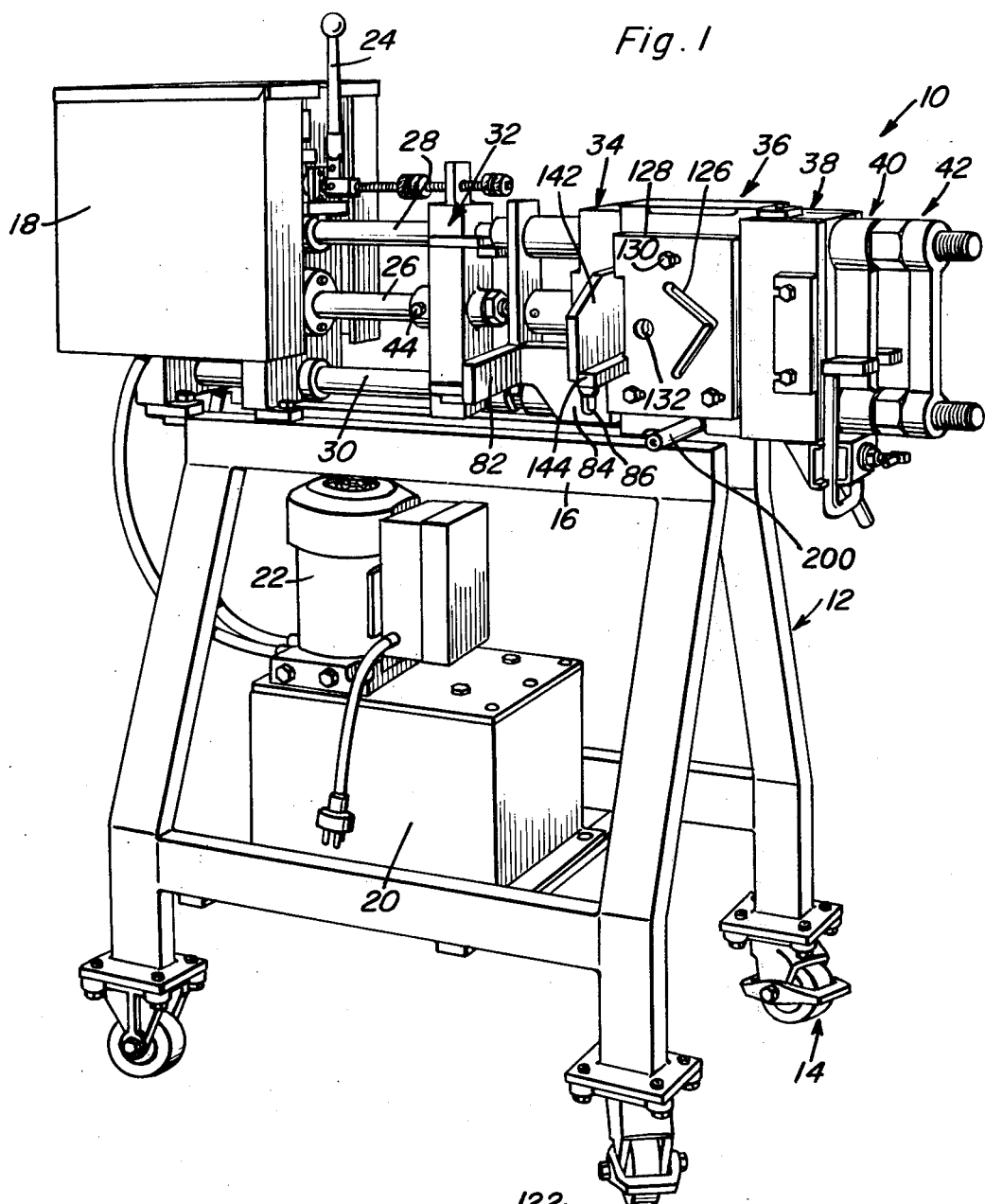
FIG. 1 is a perspective view of the machine of the present invention as seen from one side.
Figure 2:
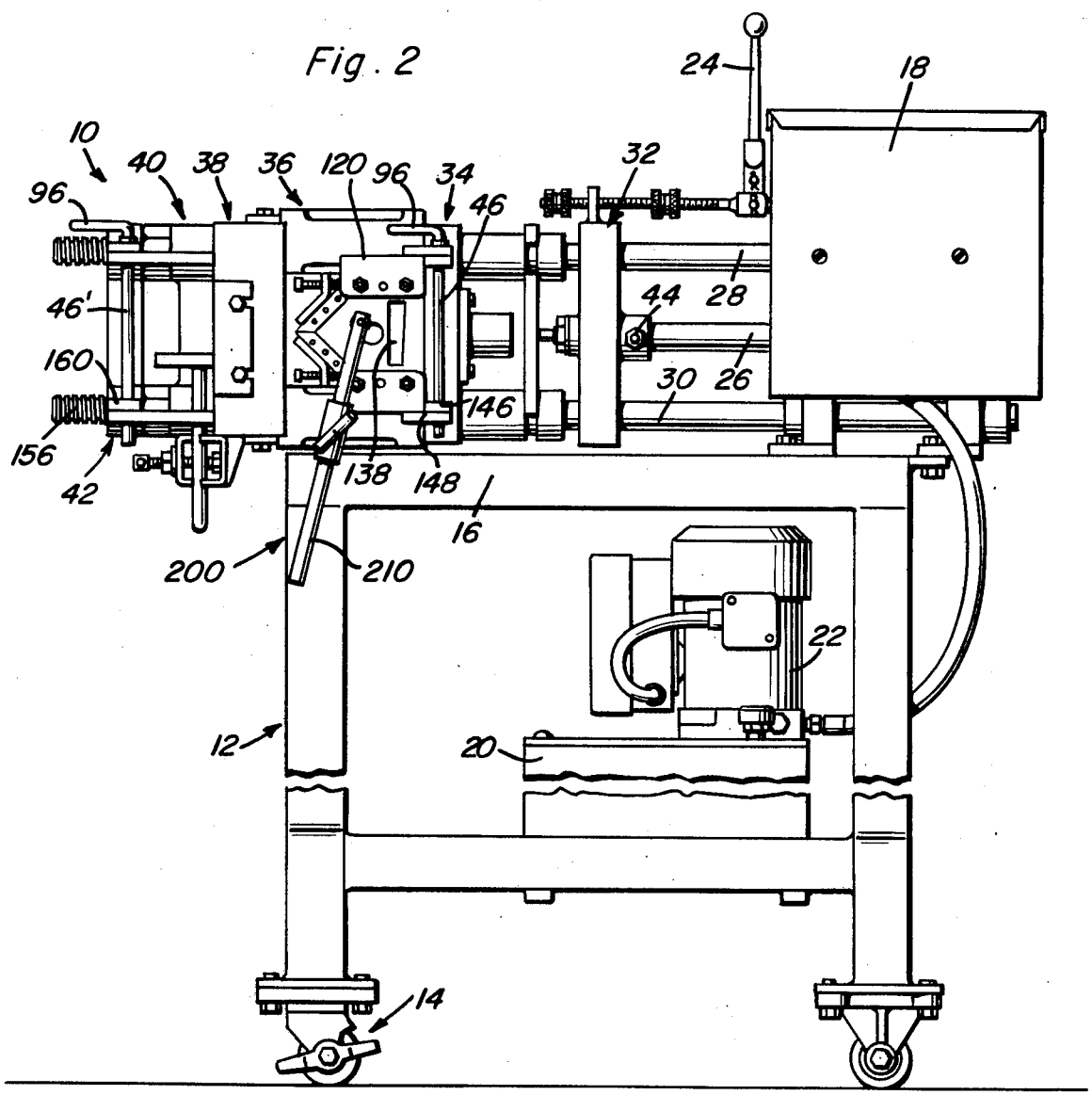
FIG. 2 is a side elevational view of the machine as seen from the other side.
Figure 3:
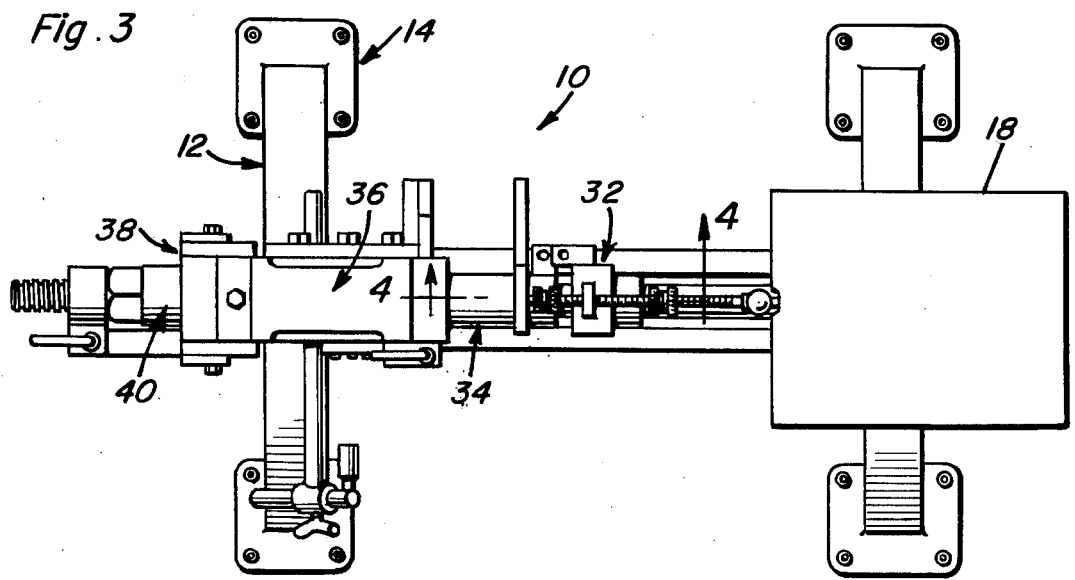
FIG. 3 is a top plan view of the machine shown in FIGS. 1 and 2.

Referring now to the drawings in detail, a metal working machine is shown FIGS. 1, 2 and 3, generally denoted by reference numeral 10. The machine includes a mobile frame 12 supported on caster wheel assemblies 14. The frame forms a horizontal bed 16 along which three work stations are established as will be hereafter explained. Supported on the bed at one end is a housing 18 enclosing a hydraulic power mechanism including a piston motor to which fluid is supplied from reservoir 20 by an electric motor driven pump 22. The reservoir and pump are mounted in the frame 12 below the bed 16. An actuating valve control handle 24 is operatively connected to the piston motor through a valve assembly in the hydraulic power mechanism to effect powered movement of a piston rod 26 through an ajustable stroke. A hydraulic power mechanism of this type is disclosed in prior U.S. Pat. No. 3,678,724.

A pair of parallel spaced guide rods 28 and 30 are fixed to the frame and extend horizontally from the power mechanism in spaced relation above the machine bed 16 to establish a path movement for a plurality of tool carrying members 32, 34, 36, 38 and 40 slidably supported on the guide rods. The free ends of the guide rods are threaded to adjustably mount a stop member 42 in fixed longitudinally spaced relation to the hydraulic power mechanism from which the piston rod 26 extends parallel to the path established by the guide rods. A punching station is established between the tool carrying slide members 32 and 34; a shearing station is established at the tool carrying slide member 36 to which the tool carrying slide member 38 is connected; and a bending station is established between the tool carrying member 38 and 40. The foregoing operational stations are made active when selected tool carrying members are rendered displaceable relative to each other by the piston rod 26 which is coupled by set-screw connector 44 to the slide member 32. Toward that end, the tool carrying members are releasably coupled to each other by coupling pins 46 and 46' as seen in FIG. 2, wherein the slide members 34 and 36 are coupled to each other to deactivate the shearing station and the stop member 42 is coupled to the slide member 38 to deactivate the bending station. The slide members 32 and 34 are uncoupled so that the punching station is activated, the slide member 34 then being held fixed to the frame through the two coupling pins 46 interconnecting the slide members 34, 36 and 38 with the stop member 42.

Referring now to FIG. 4 in particular, showing the punching station in active condition, the slide member 32 has two vertically spaced openings through which the guide rods 28 and 30 slidably extend. The slide member 32 constitutes a punch holder ram and mounts a punch tool 48 in coaxial relation to the piston rod 26. The slide member 34, which is locked to the frame as aforementioned, includes a die block holder portion 50 to which a die holder 52 is secured by a mounting plate 54 on a face of the die block holder portion confronting the punch tool 48. A button die 56 is accordingly carried by the holder 52 in coaxial relation to the punch 48 adapted to be projected through an opening 58 in a stripper 60 in response to reciprocation of the slide member 32 by the piston rod. The stripper 60 is supported by tubular supports 62 and 64 that extend axially from the die block portion 50 over the guide rods toward the slide member 32. A guide lug 66 welded to the top of the slide member 32, slidably receives a fixed stroke control rod 68 that is externally threaded to adjustably position a pair of stroke limiting nuts 70 on either axial side of the lug 66 to limit the stroke of the slide member 32.

The stripper 60 is provided with an upper lateral slot 72 as shown in FIG. 5 and a lower vertical slot 74 so as to be fitted within aligned annular grooves 76 formed in the tubular supports 62 and 64. The stripper 60 may thereby be held in place without fasteners and removed for replacement of punch and die tools by pivotal displacement as indicated by arrow 78 in FIG. 5 and radially upward withdrawal relative to the lower guide rod 30 as indicated by arrow 80. A handle formation 82 extends laterally from the stripper as more clearly seen in FIG. 5 to enable the machine operator to remove or install the stripper. Also, a plate portion 84 extends from the stripper on one side parallel to the tubular support 64 and is provided with a slot 86 receiving the threaded shank of a clamping screw 88 for locking the stripper in place. An upper edge 90 on the plate portion 84 forms a rest surface for a workpiece inserted between th stripper and the die tool 56 to be punched by the punch tool 48 upon reciprocation of the slide member 32. The stripper will, of course, prevent retraction of the workpiece with the punch tool during the return stoke of the slide member.

In the operative condition of the punching station described, the slide member 34 is held stationary and is uncoupled from the slide member 32. When the punching station is inactive, the slide member 34 is coupled to the slide member 32 as shown in FIG. 6, by means of a coupling pin 46 inserted through aligned holes in locking lugs 92 and 94 projecting laterally from the tubular stripper supports and the slide member 32 respectively. The openings in the locking lugs are aligned by bringing the slide member 32 into abutment with the tubular supports 62 and 64. The coupling pin 46 may then be inserted with its lift arm 96 disposed above the top locking lug. In this manner, the force of the piston rod 26 will be transmitted to the slide member 34 without disturbing the tool set up condition between the slide members 34 and 32. The die block portion of the slide member 34 may then act as an actuating ram for the shearing mechanism 98 as more clearly seen in FIG. 7.

Referring now to FIGS. 7, 8 and 9, the shearing mechanism 98 is carried by the slide member 36 which includes upper and lower guide blocks 100 and 102 through which the guide rods extend. The guide blocks are interconnected by a web 104 laterally offset from the guide rods to present a slide bearing surface on one side for a movable shear blade 106. A pair of spring support rods 108 are threadedly connected to the movable blade and extend longitudinally therefrom on either side of a right angle cutting edge 110, through openings in a pair of brackets 112 welded to the upper and lower guide blocks 100 and 102. Return springs 114 are positioned on the support rods 108 and react between the brackets 112 and the movable blade to yieldably resist displacement of the blade toward the brackets by the slide member 34 engaging the actuating edge 116 of the blade. No tool retracting force in accordingly required as in the case of the punching operation hereinbefore described. The movable blade is held in slide bearing contact with the web 104, by the slide bearing members 118 which in turn are held assembled on confronting surfaces of the guide blocks 100 and 102 by blade retainer plates 120 welded to the guide blocks. Fasteners 122 secure the slide bearings 118 to the retainer plates as shown in FIG. 8.

A pair of stationary blades are secured to the web 104 within a recess formed therein, in angular relation to each other as more clearly seen in FIG. 7 to form a cutting edge for a right angle workpiece inserted through a right angle slot 126 formed in a stock guide plate 128 secured by fasteners 130 to the guide blocks 100 and 102 on the side on the web 104 opposite the movable blade. The slot 126 is located in close spaced relation to the corresponding cutting edge 110 on the movable blade in its retracted position as shown in FIG. 7. A right angle workpiece may accordingly be inserted through the slot 126 in the stock guide plate up against the edges of the stationary blades 124 and be cut off by the shearing edges 110 of the movable blade when actuated by the slide member 34. The stock guide plate is also provided with a circular opening 132 aligned with an opening 134 in the movable blade 106 in its retracted position so as to receive a rod type workpiece of circular cross-section that may be sheared upon actuation of the movable blade. A stationary rod blade 136 is therefore fixed to the web within a recess as shown in FIG. 9 having a circular cutting edge aligned with the openings in the web, blade 106 and guide plate 128 to effect shearing of the rod workpiece at the bearing surface between the movable blade and the web. Finally a bar type workpiece may be inserted through a slot opening 138 in the movable blade. The workpiece bar is inserted through a slot 140 formed in one edge of the guide plate against a bar stop 142 and above a bar rest 144, the bar stop and rest being secured to the guide plate and extending laterally therefrom as more clearly seen in FIG. 1 and 9.

Figure 12:
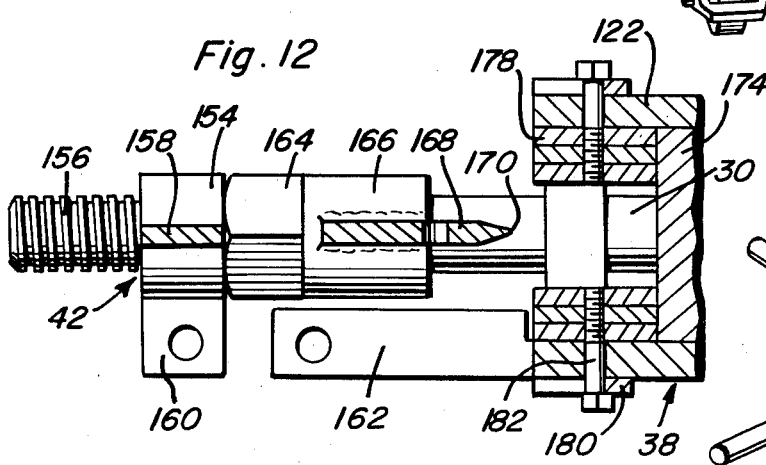
FIG. 12 is a top sectional view taken substantially through a plane indicated by section line 12—12 in FIG. 10.
Figure 11:
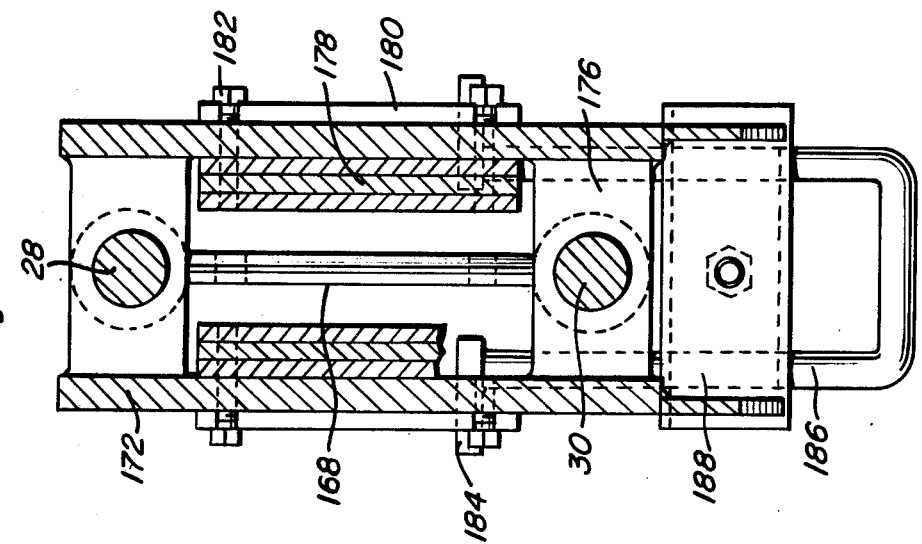
FIG. 11 is a transverse sectional view taken substantially through a plane indicated by section line 11—11 in FIG. 10.
Figure 10:
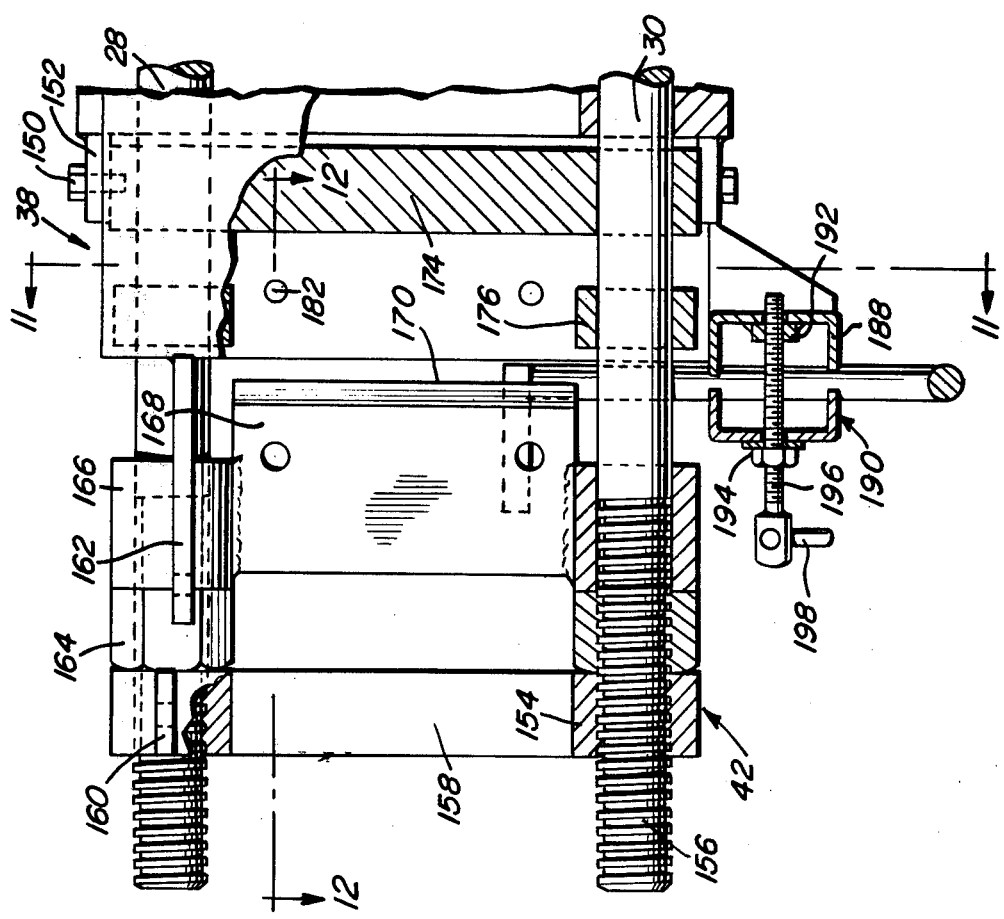
FIG. 10 is an enlarged, partial side elevational view with parts broken away and shown in section, at the bending station of the machine, in an active condition.

The slide member 34 is coupled to the slide member 36 with the block portion 50 abutting the edge 116 of the movable blade 106 in its retracted position, as shown by dotted line in FIG. 7, when the shearing station is inactive. Toward that end, locking lugs 146 and 148 extend laterally from the slide member 34 and 36 as respectively shown in FIGS. 5 and 9. When the holes in the locking lugs are aligned, a coupling pin 46 may be inserted to couple the slide members as shown in FIG. 2. With the slide members 32 and 34 also coupled to each other, the force of the piston rod 26 will be transmitted to the slide member 38 which is secured by fasteners 150 and lugs 152 to the guide blocks 100 and 102 of the slide member 36. The bending station will then be activated, provided the slide member 38 is uncoupled from the stop member 42 as shown in FIGS. 10, 11 and 12. The stop member includes internally threaded, end thrust sleeves 154 adjustably positioned on the threaded end portion 156 of the guide rods and interconnected by a web 158. Locking lugs 160 extend laterally from the sleeves 154 and as shown in FIG. 10, are longitudinally spaced from locking lugs 162 extending longitudinally from the slide member 38 through which the stop member 42 may be coupled to the slide member 38 by a coupling pin 46 as shown in FIG. 2. The stop member is spaced by a pair of spacer nuts 164, threadedly mounted on the guide rods, from tubular sleeves 166 slidably mounted on the guide rods and interconnected by a male forming punch 168 having a stationary bending edge 170. The punch 168 is adapted to be received between the side plates 172 of the slide member 38 between which a female bending die block 174 is disposed. The guide rods slidably extend through the bending die block and through upper and lower spacers 176 interconnecting the side plates 172 above and below the stationary bending punch 168. A plurality of bending die plates 178 are interconnected in stacked relation on the insides of the side plates 172 with external anchor plates 180, by means of fasteners 182. Accordingly, a flat bar type workpiece inserted between the stationary bending punch 168 and the bending die assembly, may be bent in response to reciprocation of the slide member 38. Vertically adjustable support for the workpiece is provided by a pair of work support pads 184 that are interconnected by a U-shaped support member 186 in straddling relation to the male bending punch 168. The U-shaped member 186 is clamped in a vertically adjusted position between a support bracket 188 secured to the underside of the side plates 172 of slide member 38, and a clamp bracket 190. Internally threaded nuts 192 and 194 are respectively secured to the brackets 188 and 190 and threadedly receive a threaded clamp rod 196 to which an actuating handle 198 is connected. Thus, by rotation of the clamp rod 196, the bracket 190 may be advanced into clamping engagement with or released from the member 186 to vertically adjust the position of the work support pads 184.

Figure 13:
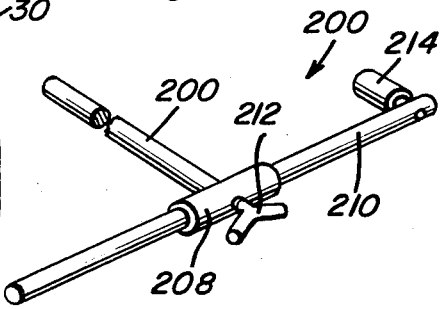
FIG. 13 is a perspective view of the work guide component associated with the machine.

Use of the machine to perform piercing, shearing and bending operations on different types of workpieces at three different work stations, will be apparent from the foregoing description, Accurate location of a work deforming operation on a workpiece at any of the work stations, may be obtained through use of a gauging tool 200 as shown in FIG. 13. The gauging tool includes a shaft 202 inserted into a bore 204 formed in the guide block 102 of slide member 36 as shown in FIG. 7, within which the shaft 202 may be locked by means of a set screw 206. A sleeve 208 is secured to one end of shaft 200, and a rod 210 is slidably received therethrough. A wing type set-screw 212 is used to lock the rod 210 is an adjusted position within the sleeve 208. A guage block 214 is secured to one end of the rod 210. The gauge block 214 will therefore be adjustably positioned laterally of the work stations by axial adjustment of the shaft 200 relative to the slide member 34 as shown in FIG. 2, in order to limit the amount by which a workpiece is extended laterally from the work station. The guage block 214 is furthermore adjustably positioned for engagement with different workpieces at any of the work stations by angular adjustment of the rod 210 about the axis of shaft 200 and radial adjustment along sleeve 208.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention.

We claim:

1. A work deforming machine comprising a frame, a plurality of separate slide members, elongated guide means mounted by the frame for establishing a path of movement along which said slide members are reciprocable, tool means response to relative movement of the slide members for performing different operations, power operated means connected to one of said slide members for imparting reciprocable movement thereto, and lock means for selectively interconnecting the slide members with each other or with the frame to perform said different operations in response to reciprocation of said one of the slide members by the power operated means, each of said different operations being performed at spaced locations along said path of movement, at least one of said tool means including cooperating tool members mounted on adjacent ones of the slide members, at least one of said tool means including cooperating tool members mounted for selective movement on one of the slide members, one of said tool members being actuated by another of the slide members adjacent thereto.

2. The combination of claim 1 wherein at least one of said tool means includes cooperating tool members, one of the tool members being fixed to the frame at one of said spaced locations and the other of the tool members being mounted on one of the slide members adjacent thereto.

3. The combination of claim 2 wherein said selective lock means includes a plurality of coupling pins interconnecting the slide members to each other and to the frame, said lock pins being selectively withdrawn to uncouple adjacent slide members from each other or from the frame.

4. A work deforming machine comprising a frame, a plurality of separate slide members; elongated guide means mounted by the frame for establishing a path of movement along which said slide members are reciprocable, tool means responsive to relative movement of the slide members for performing different operations, power operated means connected to one of said slide members for imparting reciprocable movement thereto, and lock means for selectively interconnecting the slide members with each other or with the frame to perform said different operations in response to reciprocation of said one of the slide members by the power operated means, at least one of said tool means including cooperating tool members mounted for selective movement on one of the slide members, one of said tool members being actuated by another of the slide members adjacent thereto.

5. A work deforming machine comprising a frame, a plurality of separate slide members; elongated guide means mounted by the frame for establishing a path of movement along which said slide members are reciprocable, tool means responsive to relative movement of the slide members for performing different operations, power operated means connected to one of said slide members for imparting reciprocable movement thereto, and lock means for selectively interconnecting the slide members with each other or with the frame to perform said different operations in response to reciprocation of said one of the slide members by the power operated means, said selective lock means including a plurality of coupling pins interconnecting the slide members to each other and to the frame, said lock pins being selectively withdrawn to uncouple adjacent slide members from each other or from the frame.

6. A work deforming machine comprising a frame, at least two guide rods fixed to the frame, a plurality of slide members slidably mounted by the guide rods in spaced relation to each other, power operated means connected to one of said slide members for reciprocation thereof, a stop member secured to the guide rods in spaced relation to the power operated means, releasable coupling means interconnecting adjacent ones of the slide and stop members with each other for preventing relative movement therebetween, and tool means mounted on said slide members for performing a plurality of operations on a workpiece in response to said relative movement.

7. The combination of claim 6 wherein said coupling means includes a plurality of coupling pins transmitting movement between coupled slide members or locking one of the slide members to the stop member.

8. The combination of claim 7 wherein said tool means includes cooperating punch and die mounted on an adjacent pair of the slide members to perform a punching operation when said latter slide members are uncoupled.

9. The combination of claim 8 wherein said tool means further includes shearing means mounted on another of the slide members and actuated by an adjacent one of the slide members when uncoupled from said other of the slide members to perform a shearing operation.

10. The combination of claim 9 wherein said tool means further includes cooperating punch and die mounted on the stop member and the adjacent slide member to perform a bending operation when the adjacent slide member is uncoupled from the stop member.

11. The combination of claim 6 wherein said tool means includes cooperating punch and die mounted on an adjacent pair of the slide members to perform a punching operation when said latter slide members are uncoupled.

12. The combination of claim 11 wherein said tool means further includes shearing means mounted on another of the slide members and actuated by an adjacent one of the slide members when uncoupled from said other of the slide members to perform a shearing operation.

13. The combination of claim 12 wherein said tool means further includes cooperating punch and die mounted on the stop member and the adjacent slide member to perform a bending operation when the adjacent slide member is uncoupled from the stop member.

14. The combination of claim 11 including a stripper removably carried by one of the slide members to said adjacent pair in spaced relation to the die.

15. The combination of claim 14 wherein said one of the slide members includes a slide block to which the die is secured and a pair of tubular supports extending axially from the slide block over the guide rods having aligned slots receiving the stripper therebetween.

* * * * *